US007522719B2

(12) United States Patent
Carlson et al.

(10) Patent No.: US 7,522,719 B2
(45) Date of Patent: Apr. 21, 2009

(54) SYSTEM AND METHOD FOR SERVER BASED CONFERENCE CALL VOLUME MANAGEMENT

(75) Inventors: Michael Pierre Carlson, Austin, TX (US); Jonathan Mark Wagner, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 10/756,135

(22) Filed: Jan. 13, 2004

(65) Prior Publication Data

US 2005/0152524 A1 Jul. 14, 2005

(51) Int. Cl.
*H04M 3/42* (2006.01)
*H04L 12/16* (2006.01)
*H04Q 11/00* (2006.01)
*G06F 15/16* (2006.01)

(52) U.S. Cl. .................... 379/202.01; 370/260; 709/204
(58) Field of Classification Search ............ 379/202.01; 370/267, 260; 709/204
See application file for complete search history.

(56) References Cited

U.S. PATENT DOCUMENTS

| 5,020,098 | A | 5/1991 | Celli ......................... 379/202 |
| 5,539,741 | A * | 7/1996 | Barraclough et al. ......... 370/267 |
| 5,596,644 | A | 1/1997 | Abel et al. ..................... 381/17 |
| 6,125,115 | A | 9/2000 | Smits .......................... 370/389 |
| 6,327,567 | B1 | 12/2001 | Willehadson et al. ........ 704/270 |
| 6,337,884 | B1 | 1/2002 | Cao et al. ..................... 375/257 |
| 6,522,894 | B1 | 2/2003 | Schmidt ....................... 455/552 |
| 2003/0112947 | A1 * | 6/2003 | Cohen .................... 379/202.01 |

FOREIGN PATENT DOCUMENTS

GB  2 303 516  2/1997

* cited by examiner

*Primary Examiner*—Thjuan K Addy
(74) *Attorney, Agent, or Firm*—Yee & Associates, P.C.; David A. Mims, Jr.

(57) ABSTRACT

A method for automatically adjusting the volume of individual conference call participants during a conference call. The present invention comprises a Configuration Program (CP) and a Volume Adjustment Program (VAP). The CP allows a user to configure the automatic volume adjustment options. The VAP continuously monitors the conference call and adds new participants to a display screen as the new participants are added to the conference call. Based upon the settings that the user selected in the CP, the VAP adjusts the volume of the conference call participant when the new participant is added, adjusts the volume of each conference call participant upon the occurrence of the time interval, or continuously adjusts the volume of each conference call participant. The VAP also allows the user to manually adjust the volume of all of the participants or an individual participant using a plurality of navigation buttons.

1 Claim, 5 Drawing Sheets

SYSTEM AND METHOD FOR SERVER BASED CONFERENCE CALL VOLUME MANAGEMENT

FIELD OF THE INVENTION

The present invention is related generally to methods for managing conference calls and specifically to a system and method for changing the volume of an individual participant's voice in a conference call.

BACKGROUND OF THE INVENTION

As companies continue to cut back on travel expenses, conference calls are becoming increasingly important in doing business both within the company and with other companies. One problem associated with conference calls is that not all of the conference call participants speak at the same level. In other words, some participants speak louder than others. The discrepancy between speaking levels of a loud participant and a quiet participant can make it difficult for many of the other participants to understand the speaking participant. Changing the master volume for the conference call is not an acceptable option because the level of discrepancy between a loud participant and a quiet participant remains the same. Thus, in order for the conference call to be at an acceptable volume, the listening party must increase the volume for quiet talkers and decrease the volume for loud talkers. The frequent volume changes are distracting to the listening party. Therefore, a need exists in the art for a method of adjusting the volume level of individual participants.

The prior art has previously addressed problems associated with conference calls. For example, U.S. Pat. No. 6,327,567 (the '567 patent) entitled "Method and System for Providing Audio in Conference Calls" discloses a method for differentiating conference call participants by creating different special orientations between the conference call participants' voices. The invention in the '567 patent modifies the structure of the voice signal of the participants in order to create the different special orientations. However, the invention in the '567 patent still does not solve the problem of reducing the difference in volume levels between loud participants and quiet participants. Therefore, a need still exists for a method and system for automatically adjusting the volume level or a plurality of conference call participants so that the participants' voices are all the same volume level.

SUMMARY OF THE INVENTION

The present invention, which meets the needs stated above, is a method for automatically adjusting the volume of individual conference call participants during a conference call. The software embodiment of the present invention comprises a Configuration Program (CP) and a Volume Adjustment Program (VAP). The CP allows a user to configure the automatic volume adjustment options The CP allows the user to choose between only adjusting the volume of the conference call participant at the beginning of the call, adjusting the volume of the conference call participant upon the occurrence of a time interval, or continuously adjusting the volume of the conference call participant.

The VAP continuously monitors the conference call and adds new participants to a display screen as the new participants are added to the conference call. Based upon the settings that the user selected in the CP, the VAP adjusts the volume of the conference call participant when the new participant is added, adjusts the volume of each conference call participant upon the occurrence of the time interval, or continuously adjusts the volume of each conference call participant. The VAP also allows the user to manually adjust the volume of all of the participants or an individual participant using a plurality of navigation buttons.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "adjust" shall mean to modify the volume level of a participant.

As used herein, the term "computer" shall mean a machine having a processor, a memory, and an operating system, capable of interaction with a user or other computer, and shall include without limitation desktop computers, notebook computers, personal digital assistants (PDAs), servers, hand-held computers, and similar devices.

As used herein, the term "conference call" shall mean a telephonic or Internet meeting between a plurality of people.

As used herein, the term "participant" shall mean a person who attends a conference call.

Figure 1:
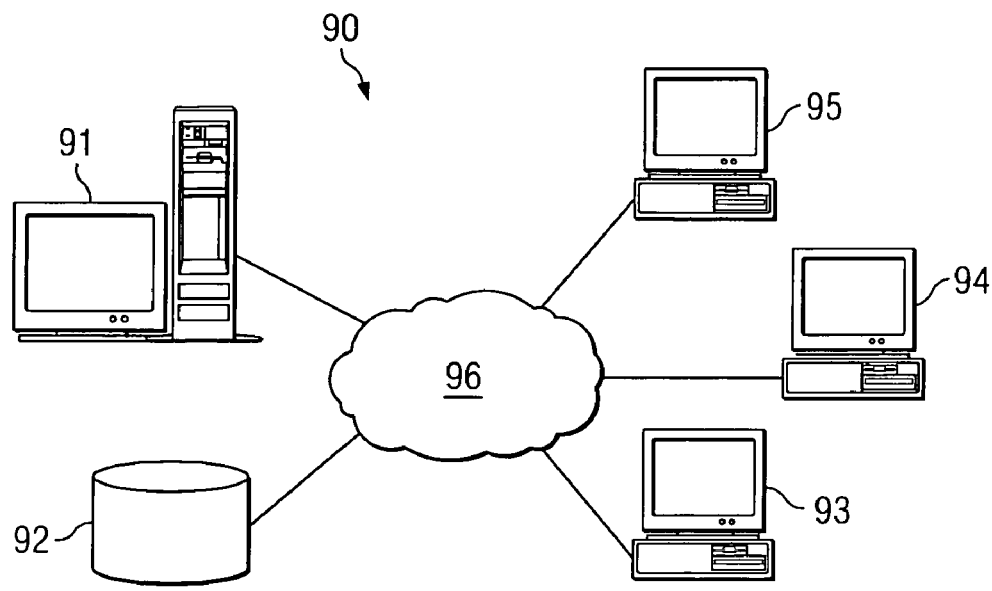
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
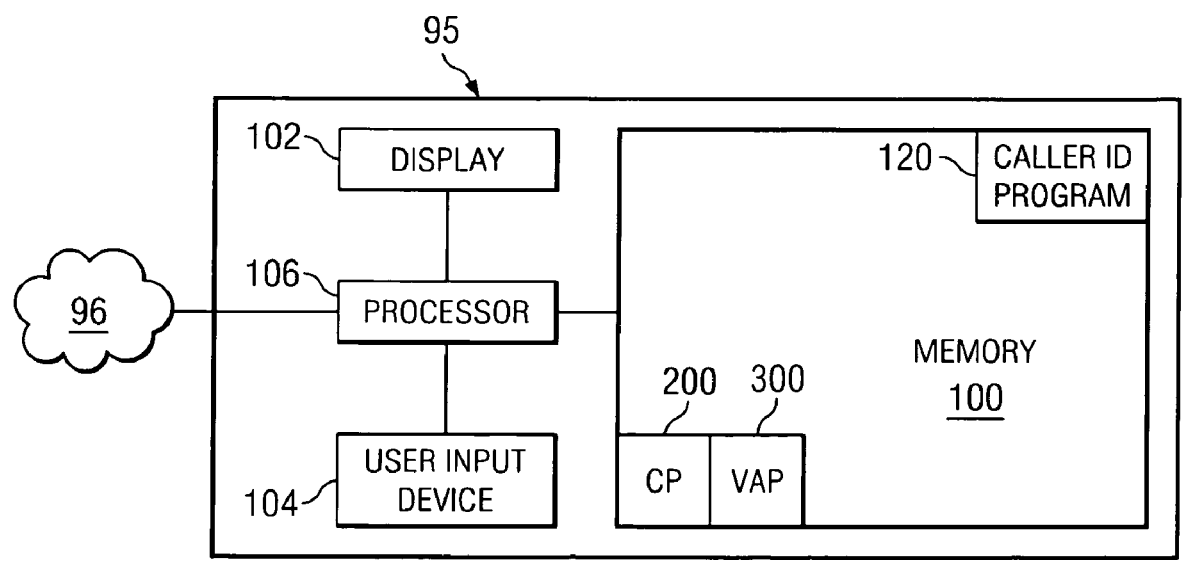
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Configuration Program (CP) 200 and Volume Adjustment Program (VAP) 300.

CP 200 and VAP 300 described herein can be stored within the memory of any computer depicted in FIG. 1. Alternatively, CP 200 and/or VAP 300 can be stored in an external storage device such as a removable disk, a CD-ROM, or a USB storage device. Memory 100 is illustrative of the memory within one of the computers of FIG. 1. Memory 100 also contains caller ID program 120. The present invention may interface with caller ID program 120 through memory 100. As part of the present invention, the memory 100 can be configured with CP 200 and/or VAP 300. Processor 106 can execute the instructions contained in CP 200 and/or VAP 300. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 86.

In alternative embodiments, CP 200 and/or VAP 300 can be stored in the memory of other computers. Storing CP 200 and/or VAP 300 in the memory of other computers allows the processor workload to be distributed across a plurality of processors instead of a single processor. Further configurations of CP 200 and/or VAP 300 across various memories are known by persons of ordinary skill in the art. The present invention may be a method, a stand alone computer program, or a plug-in to an existing computer program. Persons of ordinary skill in the art are aware of how to configure computer programs, such as those described herein, to plug into an existing computer program. Caller ID program 120 depicted herein is a program which uses information transmitted over the telephone and/or data lines to identify a participant when the telephone rings. Persons of ordinary skill in the art are aware of how to make a caller ID program such as caller ID program 120 display a participant's name and telephone number on a display device.

The software described herein can be implemented at a conference call center or on the conference call participant's hardware, such as a telephone or a computer. If the present invention is implemented at a conference calling center, then the individual conference participant's volume is adjusted at the conference calling center, and the uniform volume level is sent to each of the conference call participants. If the present invention is implemented on the participants' telephones, then the individual participants' volume level is adjusted by the user's hardware, such as the telephone, box, or computer illustrated in FIGS. 7-9.

Figure 3:
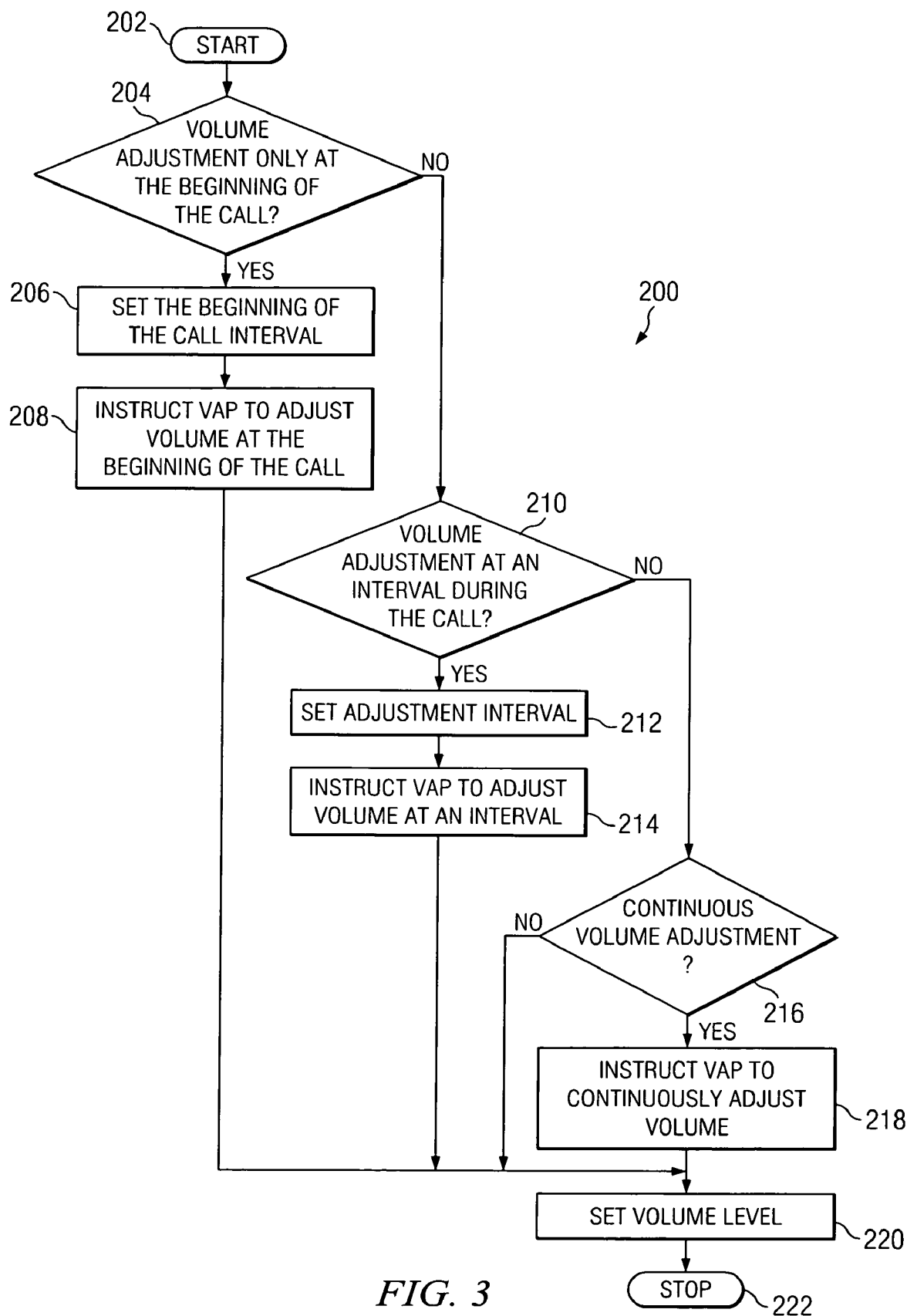
FIG. 3 is an illustration of the logic of the Configuration Program (CP) of the present invention.

FIG. 3 illustrates the logic of Configuration Program (CP) 200 of the present invention. CP 200 is a program that allows the user of the present invention to configure the automated volume adjustment options. CP 200 must be run before Volume Adjustment Program (VAP) 300 can be run. CP 200 starts (202) when invoked by the user. CP 200 then makes a determination whether the user wants the present invention to adjust the conference call participants' volume only at the beginning of a call (204). If the user does not want the present invention to adjust the conference call participants' volume only at the beginning of a call, then CP 200 proceeds to step 210. If the user wants the present invention to adjust the conference call participants' volume only at the beginning of a call, the user sets the interval (i.e. during the first sixty seconds after a new participant connects to the conference call) during which a new participant's volume will be adjusted (206). CP 200 then instructs VAP 300 to adjust the participant's volume only at the beginning of a call (208) and proceeds to step 220.

At step 210, CP 200 determines whether the user wants the present invention to adjust the participants' volume at intervals during the conference call (210). If the user does not want the present invention to adjust the participants' volume at intervals during the conference call, then CP 200 proceeds to step 216. If the user wants the present invention to adjust the participants' volume at intervals during the conference call, then the user enters the adjust interval (i.e. every five minutes during the conference call) (212). CP 200 then instructs VAP 300 adjust the conference call participants' volume at the adjustment interval (214) and proceeds to step 220.

At step 216, CP 200 determines if the user wants the present invention to continuously adjust the conference call participants' volume (216). If the user does not want the present invention to continuously adjust the conference call participants' volume, then CP 200 proceeds to step 220. If the user wants the present invention to continuously adjust the conference call participants' volume, CP 200 instructs VAP 300 to continuously adjust the conference call participants' volume (218), then proceeds to step 220. At step 220, the user selects the desired volume level (220) and CP 200 ends (222). If desired, the present invention may be configured such that the user can change any of the options in CP 200, including the volume setting, during the conference call.

Figure 4:
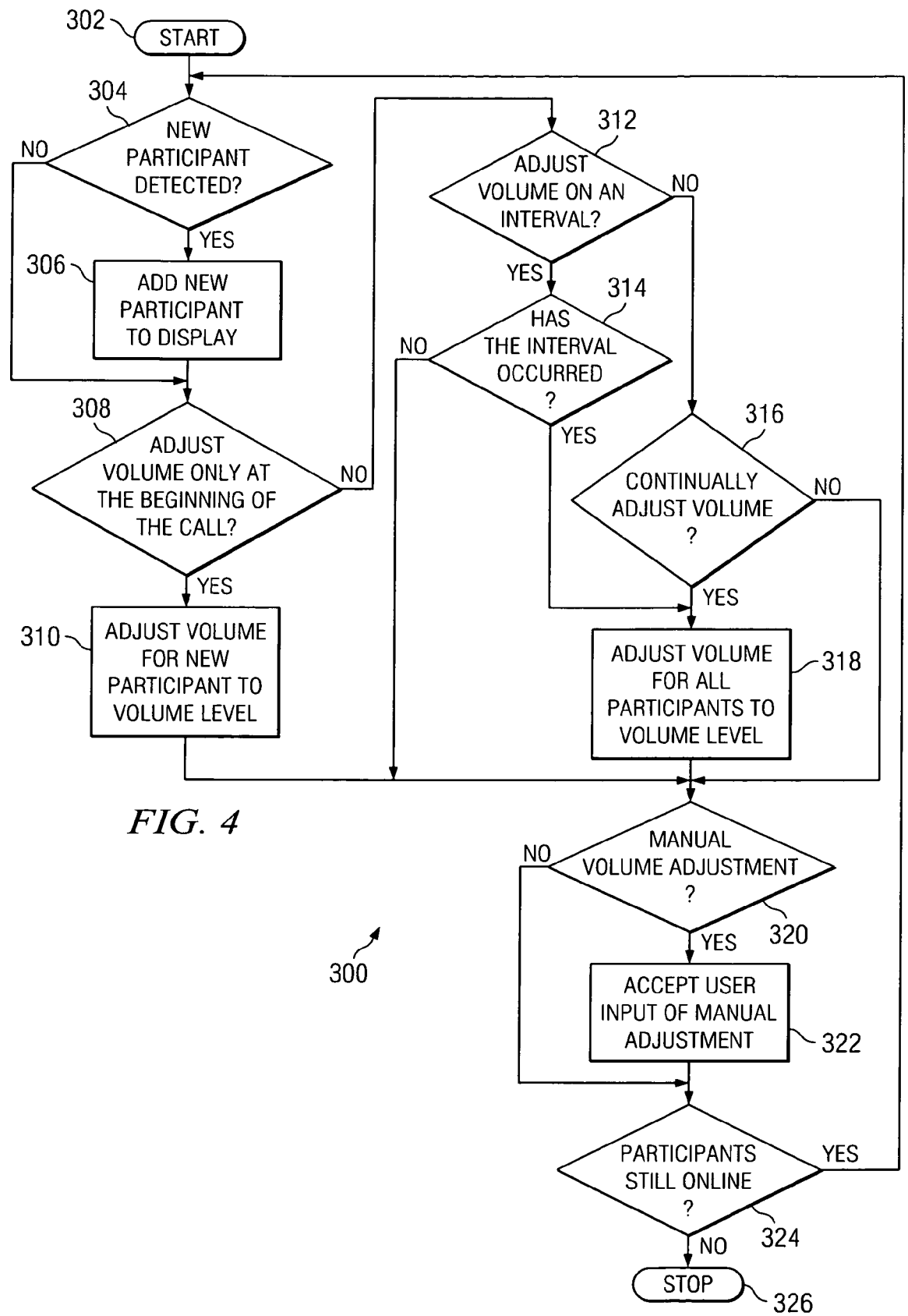
FIG. 4 is an illustration of the logic of the Volume Adjustment Program (VAP) of the present invention.

FIG. 4 illustrates the logic of Volume Adjustment Program (VAP) 300 of the present invention. VAP 300 is a program that adjusts the individual conference call participants' volume during a conference call. Adjusting the individual conference call participant's volume allows the present invention to produce a conference call in which all of the conference call participants speak at the same volume level. VAP 300 starts (302) whenever the user connects to a conference call. VAP 300 then determines whether a new participant is detected (304). A new participant will be detected when the user connects to conference call or a new conference call participant connects to the conference call. If VAP 300 determines that a new participant is not detected, VAP 300 proceeds to step 308. If VAP 300 determines that a new participant is detected, VAP 300 adds the new participant to the display (306) and proceeds to step 308. The display may be like graphical user interfaces (GUIs) depicted in FIGS. 5 and 6.

At step 308, VAP 300 determines whether the user configured the present invention to adjust the volume only at the beginning of the call (308). If the user did not configure the present invention to adjust the volume only at the beginning of the call, VAP 300 proceeds to step 312. If the user configured the present invention to adjust the volume only at the beginning of the call, VAP 300 adjusts the new participant's volume to the user selected volume level (310) and proceeds to step 320.

At step 312, VAP 300 determines whether the user configured the present invention to adjust the volume on an interval (312). If the user did not configure the present invention to adjust the volume on an interval, VAP 300 proceeds to step 316. If the user configured the present invention to adjust the volume on an interval, VAP 300 determines whether the interval has occurred (314). Persons of ordinary skill in the art are aware of how to configure the present invention with a timer to determine whether an interval has occurred. If the interval has not occurred, VAP 300 proceeds to step 320. If the interval has occurred, VAP 300 proceeds to step 318. At step 316, VAP 300 determines whether the user configured the present invention to continuously adjust the conference call participants' volume (316). If the user did not configure the present invention to continuously adjust the conference call participants' volume, then VAP 300 proceeds to step 320. If the user configured the present invention to continuously adjust the conference call participants' volume, VAP 300 adjusts each conference call participants' volume to the user selected volume level (318) and proceeds to step 320.

At step 320, VAP 300 determines whether the user has manually adjusted the volume (320). If the user has not manually adjusted the volume, VAP 300 proceeds to step 324. If the user has manually adjusted the volume, VAP 300 accepts the user input adjusting the volume of an individual conference call participant (322) and proceeds to step 324. Alternatively, the user can adjust the master volume so that the volume of every conference call participant is adjusted the same amount. At step 324, VAP 300 determines whether there are still participants on the line (324). If there are still participants on the line, VAP 300 returns to step 304. If there are no longer any participants on the line, VAP 300 ends (326).

Figure 5:
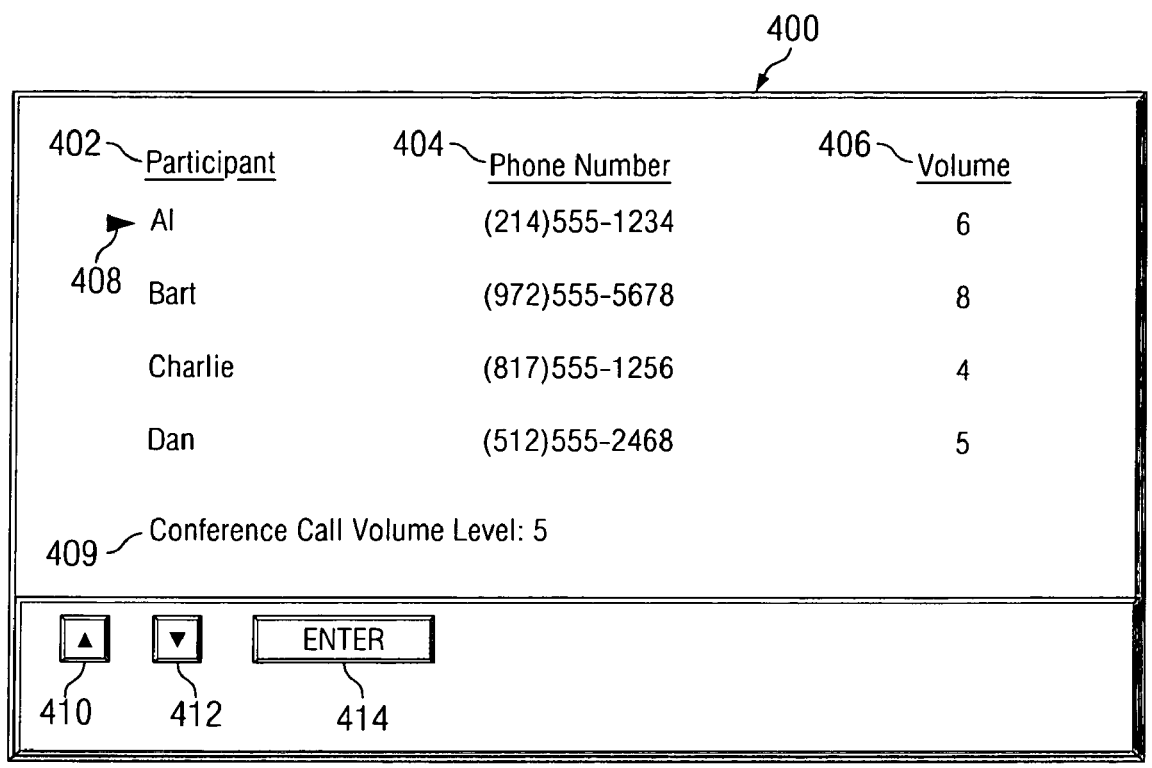
FIG. 5 is an illustration of the graphical user interface (GUI) of the present invention.
Figure 6:
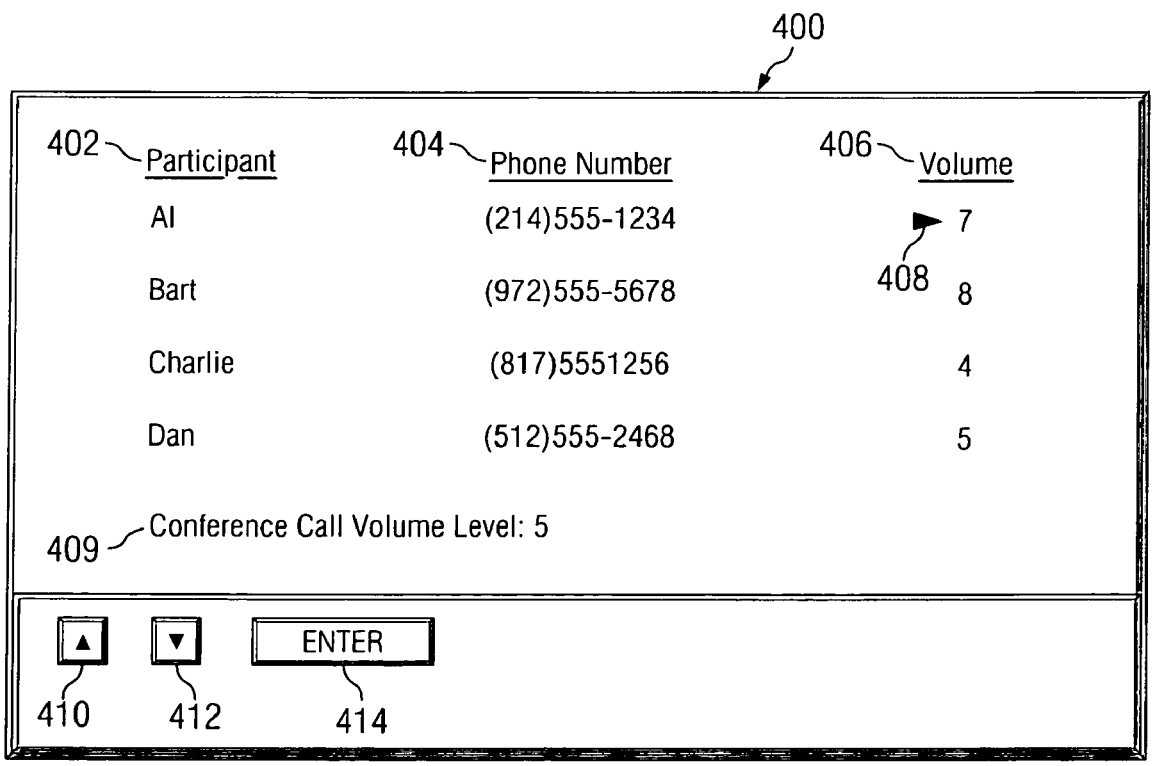
FIG. 6 is an illustration of the GUI of the present invention.

FIGS. 5 and 6 illustrated graphical user interface (GUI) 400 of the present invention. GUI 400 is a display that depicts conference call participants 402, phone numbers 404, volume level 406, and conference call volume level 409. The user may move pointer 408 vertically from one conference call participant 402 to another (See FIG. 5) or to conference call volume level 409 using up button 410 and down button 412. When the user desires to adjust an individual conference call participant's volume level 406 manually, the user selects the conference call participant using enter button 414. Pointer 408 then moves over to volume level 406 (See FIG. 6), where the user can adjust the volume level using up button 410 and down button 412. The user may then press enter button 414 again to move pointer 408 back to conference call participant 402. When the user desires to adjust the master volume manually, the user selects conference call volume level 409 using enter button 414. The user can adjust the volume level using up button 410 and down button 412. Up button 410, down button 412, and enter button 414 may collectively be referred to as navigation buttons.

Figure 7:
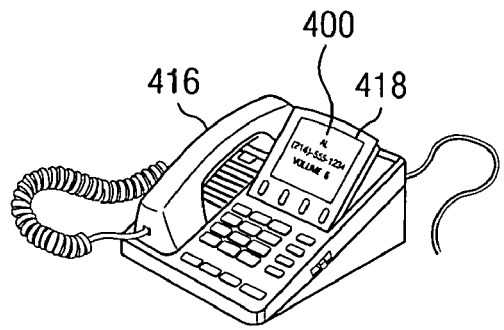
FIG. 7 is an illustration of the present invention telephone.
Figure 8:
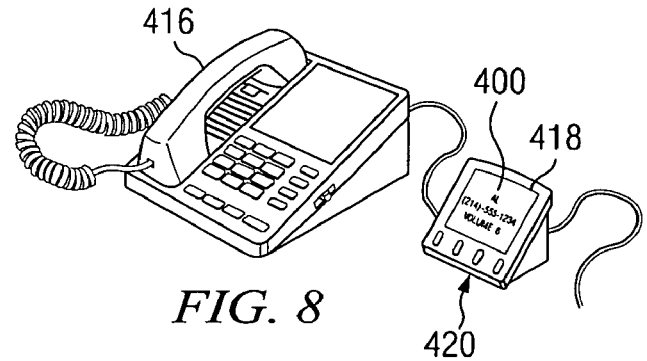
FIG. 8 is an illustration of the present invention box attached to a telephone.
Figure 9:
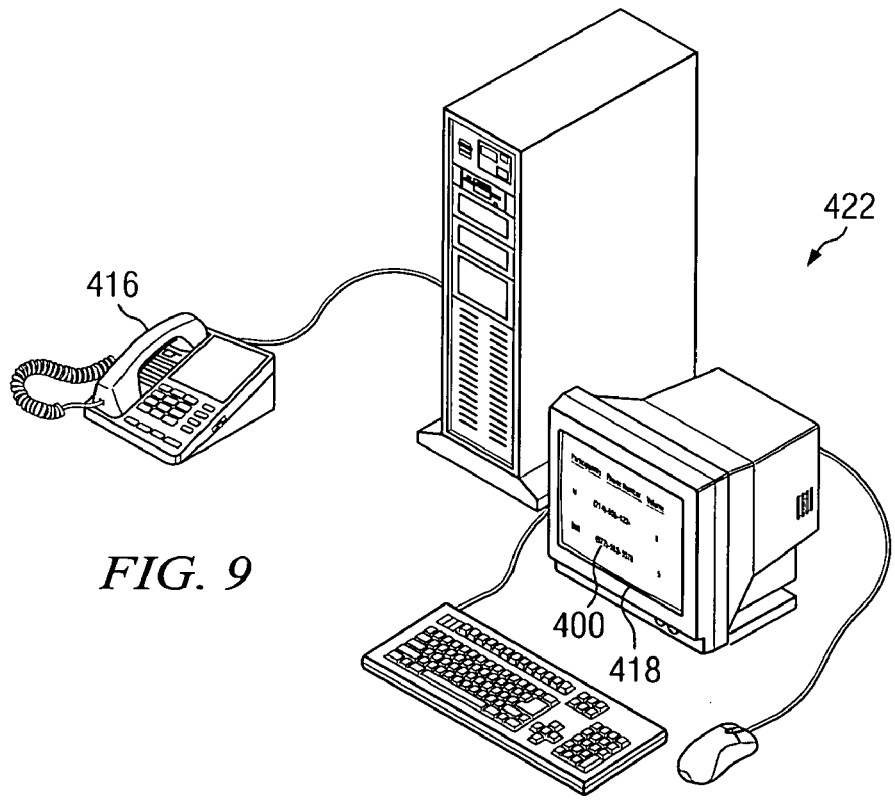
FIG. 9 is an illustration of the present invention installed on a computer connected to a telephone.

FIGS. 7, 8, and 9 are examples of different hardware that may contain the present invention. FIG. 7 is an illustration of telephone 416. Telephone 416 contains a display screen 418, which may display GUI 400. Telephone 416 may also contain navigation buttons. FIG. 8 is an illustration of telephone 416 without a display screen. Telephone 416 is connected to box 420 that contains display screen 418. Display screen 418 may display GUI 400. Either telephone 416 or box 420 may contain navigation buttons. FIG. 9 is an illustration of telephone 416 connected to computer 422. Computer 422 contains display screen 418, which may display GUI 400. Persons of ordinary skill in the art are aware of how to connect a computer to a telephone to display information transmitted over the telephone line.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for equalizing volume levels for a plurality of people who participate in a conference call, the method comprising:

establishing a conference call for a plurality of people, and setting a conference call volume level for all of the people who participate in the conference call;

determining whether a participant has joined the conference call;

responsive to the determination that the participant has joined the conference call, adding a participant name, a participant phone number, and a participant volume to a display screen;

determining whether a user has indicated that the participant volume is to be adjusted only at the beginning of the participant's connection to the conference call;

responsive to the determination that the user has indicated that the participant volume is to be adjusted only at the beginning of the participant's connection to the conference call, automatically adjusting the participant volume to substantially equal the conference call volume level, during a user set interval after the participant joins the conference call, and ceasing further adjustment of the participant volume after the expiration of the user set interval;

determining whether the user has indicated that the participant volume level is to be adjusted upon the occurrence of an adjust interval;

responsive to the determination that the user has indicated that the participant volume is to be adjusted upon the occurrence of the adjust interval, determining if the adjust interval has occurred; and responsive to the determination that the adjust interval has occurred, automatically adjusting the participant volume to substantially equal the conference call volume level;

determining whether the user has indicated that the participant volume is to be adjusted continuously;

responsive to the determination that the user has indicated that the participant volume is to be adjusted continuously, automatically and continuously adjusting the participant volume to substantially equal the conference call volume level; and repeating the steps of the method when each of the people joins the conference call as a participant;

wherein the volume of all of the participants in a conference call are automatically adjusted to be substantially equal to a conference call volume level.

* * * * *